United States Patent [19]

Swatek

[11] Patent Number: 5,209,577
[45] Date of Patent: May 11, 1993

[54] DOWNHOLE ROTATING MACHINE HAVING COMPLIANT RADIAL BEARINGS

[75] Inventor: Mike A. Swatek, Bartlesville, Okla.

[73] Assignee: Camco International, Inc., Houston, Tex.

[21] Appl. No.: 791,197

[22] Filed: Nov. 13, 1991

[51] Int. Cl.$^5$ ............................................. F16C 27/00
[52] U.S. Cl. ........................................ 384/97; 384/220
[58] Field of Search .................. 384/97, 99, 215, 220, 384/222, 276, 297, 907.1; 175/371, 107

[56] References Cited

U.S. PATENT DOCUMENTS

| | | | |
|---|---|---|---|
| 2,343,585 | 3/1944 | Schott | 384/97 |
| 2,793,087 | 5/1957 | Hayes | 384/97 |
| 3,301,613 | 1/1967 | DeClaire | 384/220 |
| 4,029,368 | 6/1977 | Tschirky et al. | 384/97 |
| 4,664,595 | 5/1987 | Tsuji et al. | 384/222 X |
| 4,669,893 | 6/1987 | Chalaire et al. | 384/99 |

FOREIGN PATENT DOCUMENTS

62-251786 4/1989 Japan .
63-225399 3/1990 Japan .

*Primary Examiner*—Thomas R. Hannon
*Attorney, Agent, or Firm*—Arnold, White & Durkee

[57] ABSTRACT

The invention provides a downhole rotating machine having a compliant radial bearing system. The compliant radial bearings in accordance with the present invention utilize a variable dimension fluid chamber between adjacent components in the bearing system. These variable fluid chambers may be defined by elastomeric members, such as o-rings. The dimension of the variable fluid chamber as well as the fluid therein serves to dampen vibration and mechanical shock to bearing components. This vibration and shock dampening facilitates the use of ceramic components within the bearing system.

17 Claims, 5 Drawing Sheets

DOWNHOLE ROTATING MACHINE HAVING COMPLIANT RADIAL BEARINGS

BACKGROUND OF THE INVENTION

The present invention relates generally to rotating machines, such as pumps and motors, for use in a subterranean well environment, which machines include radial bearings; and more specifically relates to such machines wherein the radial bearings are compliant bearings with fluid dampening.

Many types of downhole rotating machines, such as pumps and motors and related devices, are known for use in subterranean well environments. These rotating machines are subjected to relatively unique conditions in such wells. Not only must the machines be operative under conditions of relatively high temperature and pressure, but also they must operate satisfactorily when exposed to a variety of types of well fluids. Many types of downhole rotating machines, and in particular, many types of downhole pumps and motors, are subjected to downhole well fluids which include not only the fluidic component but also sand or other solids forming an abrasive component. Additionally, due to the hostile and variable environment, downhole rotating machines often produce substantial vibration, which vibration can exert substantial forces and strains on a bearing system.

Attempts to find a bearing system suitable for withstanding the exposure to well fluids, and to withstand the abrasion which results therefrom, has resulted in attempts to use materials such as ceramics as a bearing surface. A disadvantage presented by the use of ceramics as a bearing material, however, is that the ceramic products are typically relatively brittle, and are thus highly prone to breakage in a subsurface environment where vibration and other mechanical impact forces are common. Additionally, ceramics typically have a different coefficient of thermal expansion than that of other materials typically used in downhole machines. This further leads to inadequate performance of these conventional bearing systems. For example, in some downhole applications where conventional bearing systems including ceramic elements have been utilized, exposure to high temperatures has resulted in the alteration of tolerances such that components which were initially "press fit" become loose and rotatable relative to one another, thereby resulting in failure of the bearing system.

Accordingly, the present invention provides a new radial bearing system particularly adapted for use in a downhole rotating machine, which bearing system provides a fluid dampened compliant bearing both to optimize the dampening of mechanical forces within the bearing system and to facilitate the cooperative use of materials with different performance characteristics at temperature. This new bearing system design, therefore, further allows the use of ceramic components, such as a ceramic bearing sleeve, to provide optimal abrasion resistance of the bearing system.

SUMMARY OF THE INVENTION

The present invention provides a downhole rotating assembly which is particularly well suited for use in a subterranean well environment. The downhole rotating assembly will include a first assembly, which may be a relatively static member, such as, for example, a pump housing, a motor stator, etc.; and will include a second, relatively rotatable, assembly, such as a pump shaft and impeller assembly, a motor rotor, etc. The bearing assembly in accordance with the present invention is adapted to engage both the first assembly and the second assembly to facilitate the desired relative rotation therebetween.

Bearing assemblies in accordance with the present invention will preferably include three primary components, a bearing housing, a bearing bushing, and a bearing sleeve. The bearing housing may be a separate member adapted to be retained within the first assembly, or may actually be a portion of the first assembly itself.

In a preferred embodiment, the bearing sleeve will engage the second assembly, and will be formed of a ceramic material. In one particularly preferred embodiment, the bearing sleeve is formed of a silicon carbide ceramic. The bearing assembly also preferably includes a bearing bushing extending between the bearing sleeve and the bearing housing. In one particularly preferred embodiment, this bearing bushing will be of a greater longitudinal dimension than the bearing sleeve, so as to completely cover the bearing sleeve.

In accordance with the present invention, a fluid chamber is formed between at least two adjacent components between the first assembly and the second assembly. For example, the variable fluid chamber may be formed between the second assembly and the bearing sleeve, between the bearing bushing and the bearing housing, or between the bearing housing and the first assembly. Whereever the fluid chamber is formed, the chamber will be defined by at least one, and preferably at least two generally resilient members, resulting in a fluid chamber of variable shape and dimension. In one preferred embodiment, these resilient members will each comprise o-rings constructed of a generally elastomeric material. Additionally, in one particularly preferred embodiment, fluid communication will be provided between the exterior of the bearing assembly and the fluid chamber. The variable fluid chamber provides vibration dampening, and further facilitates differing rates of expansion of the bearing assembly components of the bearing assembly when exposed to downhole temperatures.

DETAILED DESCRIPTION OF PREFERRED EMBODIMENTS

Figure 1:
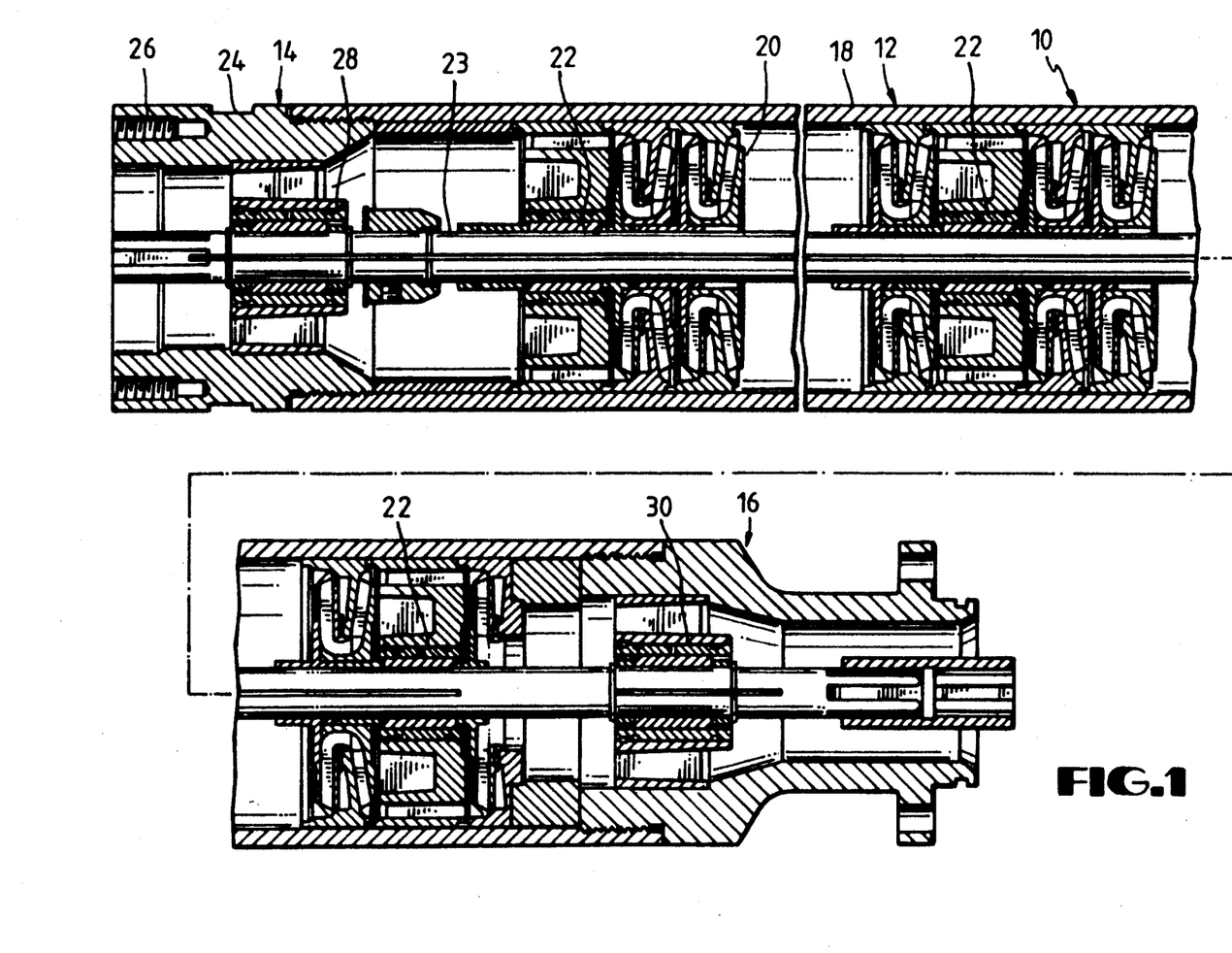
FIG. 1 depicts an exemplary rotating machine, in particular a downhole pump assembly, in accordance with the present invention.

Referring now to the drawings in more detail, and particularly to FIG. 1, therein is depicted an exemplary downhole rotating machine, and specifically an exemplary pump assembly, indicated generally at 10. Pump assembly 10 includes a plurality of compliant radial bearings in accordance with the present invention, as will be described in more detail later herein.

Pump assembly 10 includes a central pump section, indicated generally at 12; an upper, or "head end," assembly, indicated generally at 14; and a lower, or "base end," assembly, indicated generally at 16. Pump section assembly 12 includes a housing 18 and a plurality of pump segments, as indicated typically at 20, and spaced stage bearing assemblies, as indicated typically at 22. As will be appreciated by those skilled in the art, pump section assembly 12 will actually include a complete stack of pump segments 20, between each stage bearing assembly 22, however, only representative pump segments 20 have been depicted in FIG. 1, for clarity of illustration.

Each stage bearing 22 depicted in FIG. 1, is a compliant radial bearing assembly 22 in accordance with the present invention. These compliant radial bearing assemblies 22 are included within pump section assembly 12 at predetermined desired spacings. The specific structure of each of these compliant radial bearing assemblies will be discussed in more detail in reference to FIGS. 2 and 3.

Head end assembly 14 includes a top sub 24 coupled to housing 18 of pump section assembly 12. The purpose of head end assembly 14 is to facilitate attachment to other pieces of downhole equipment, and to provide stabilization, through radial bearing assembly 28, for the upper end of pump assembly shaft 23.

The purpose of base end assembly 16 is once again to facilitate coupling of pump assembly 10 to other pieces of downhole equipment, such as protector assemblies or additional pump assemblies, and to provide shaft stabilization, through radial bearing assembly 30, for the lower end of pump assembly shaft 23.

Figure 2:
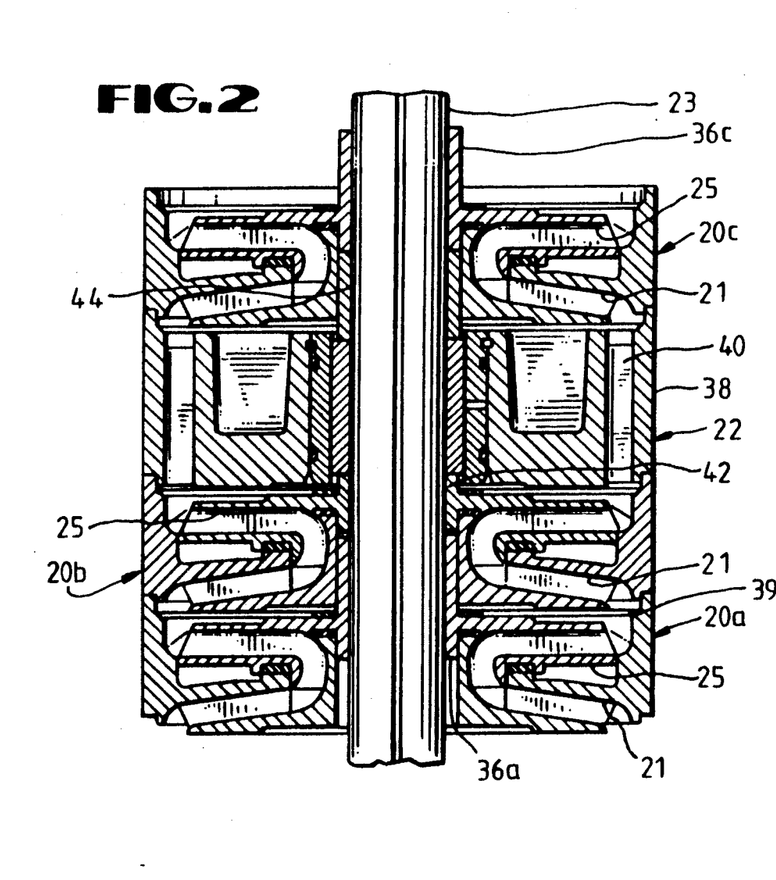
FIG. 2 depicts a pump unit assembly of the pump of FIG. 1, illustrated partially in vertical section.

Referring now also to FIG. 2, therein is depicted a portion of pump section assembly 12, illustrated partially in vertical section. FIG. 2 depicts three pump segments, indicated at 20a, 20b, and 20c, and one stage bearing, in the form of a compliant radial bearing assembly, in accordance with the present invention, indicated at 22. The structure and operation of pump segments 20a, 20b, and 20c are well-known to those skilled in the art. Briefly, each pump section includes a diffuser 21 partially defining a fluid passageway, and a rotatable impeller 25 configured to cause fluid to traverse the stack of pump section assemblies when pump shaft 23 and impellers 25 are rotated. At placements along pump shaft 23 where a compliant radial bearing assembly 22 is desired, a spacer assembly 38 is inserted between pump segments 20. Spacer 38 serves to provide longitudinal spacing between pump segments 20 to facilitate placement of compliant radial bearing 22, and also provides a flow passage 40 for providing fluid communication between pump segments 20b and 20c on opposite sides of compliant radial bearing assembly 22. Spacer 38 may be formed of any suitable material, such as a cast metal, and may be formed of the same material utilized for diffusers 21.

As can be seen in FIG. 2, each impeller includes an inner annular portion, as indicated at 36a, 36c and 42 to facilitate engagement with pump shaft 23. In one preferred design, these inner annular portions are dimensioned so as to bridge the lateral division 39 between pump segments 20, as depicted by inner annular portion 36a of pump segment 20a. However, in this preferred pump design, annular section 42 of pump segment 20b on a first, lower, side of radial bearing 22 will be shortened, to provide space along shaft 23 for radial bearing 22. Conversely, on the opposite, upper, side of radial bearing assembly 22, a spacer 44 will be inserted between radial bearing assembly 22 and inner annular portion 36b of pump segment 20c.

Figure 3:
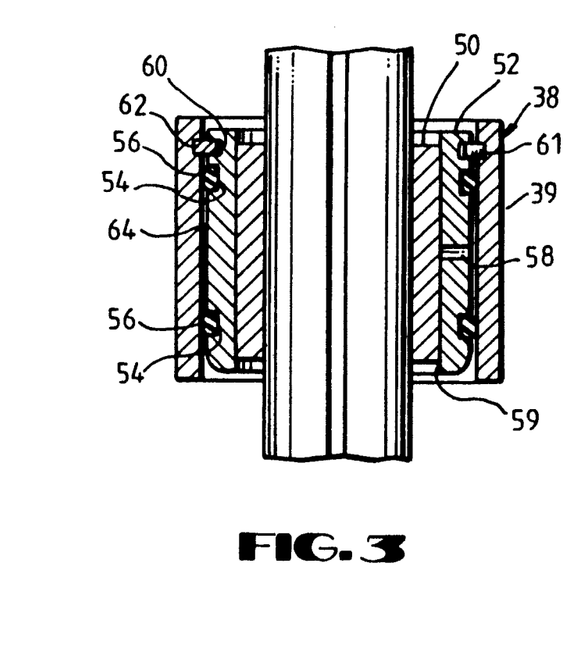
FIG. 3 depicts an exemplary compliant bearing in accordance with the present invention, depicted partially in vertical section.

Referring now also to FIG. 3, therein is depicted compliant radial bearing assembly 22 in greater detail. Each compliant radial bearing assembly 22 includes a bearing sleeve 50, a bearing bushing 52, and a housing member, which, in the depicted embodiment is provided by spacer member 38. In this preferred embodiment, the inner portion 39 of spacer 38 forming the bearing housing defines a generally cylindrical internal bore, adapted to cooperatively engage bearing bushing 52, as will be described in more detail below.

In this preferred embodiment, bearing bushing 52 is of a generally tubular shape, having a generally cylindrical external surface and a generally cylindrical internal bore. Bearing bushing 52 may be constructed of any suitable material, but preferably will be constructed of a hard metal. In this preferred embodiment, bearing bushing 52 is constructed of high chrome cast steel, sometimes referred to as "white iron." Alternatively, bearing bushing may also be constructed of any suitable material exhibiting sufficient abrasion and fracture resistance. For example, other metals such as high nickel cast steels, such as are known under the tradename Ni-Resist may be utilized, as well as ceramic materials.

Bearing bushing 52 includes two circumferential grooves 54 on its exterior surface. Each groove 54 houses a compliant ring, which, in one preferred embodiment, is an o-ring 56. The o-rings 56 are formed of a material having both a selected hardness to provide a desired resilience between bearing bushing 52 and housing 39, and suitable properties to withstand the temperatures and fluids to which the o-rings will be exposed. In this preferred embodiment, o-rings 56 are formed of Aflas, and are of 90 durometer. The Aflas is resistant to chemical attack and maintains its resilience and elasticity at elevated temperatures.

Bearing bushing 52 also includes a vent aperture 58 placed intermediate o-ring grooves 54. In this preferred embodiment, bearing bushing 52 also includes a retention ring groove 60. Bearing housing 39 will also include a retention ring groove 62. Retention ring grooves 60 and 62 will be cooperatively engaged by a retaining ring, such as a compressible split ring 61 which will serve to maintain bearing bushing 52 and bearing housing 39 in a generally fixed longitudinal relation, so as to maintain bearing assembly 22 in an operative configuration.

When bearing bushing 52, with O-rings 56 is installed within the inner portion 39 forming the bearing housing, the variable fluid chamber 64 will be formed. Variable fluid chamber 64 will be variable in shape and dimension. The volume of variable fluid chamber 64 will, however, be substantially constant. The precise dimensions of chamber 64 will, of course, be determined by the relative external diameter of bearing bushing 52, the internal diameter of the wall portion 39 forming the bearing housing, and the dimensions of o-rings 56.

Bearing sleeve 50 is again preferably an annular member, preferably constructed of a ceramic material, and most preferably constructed of silicon carbide ceramic. An appropriate silicon carbide ceramic is that identified as type "SA", which may be obtained from Carborundum Company of Niagara Falls, N.Y. As with bearing bushing 52, bearing sleeve 50 may also be constructed of other materials, including, for example, metals or other ceramics.

As will be appreciated by those skilled in the art, the dimensions of each component of compliant radial bearing assembly 22 may vary according to the specific application. By way of example, however, in one exemplary configuration, where pump shaft 23 is 0.625 inch in diameter, bearing sleeve 52 will be approximately 0.688 inch long, and will have a wall thickness (between the inner and outer diameters) of approximately 0.125 inch. In this same embodiment, the bearing bushing will preferably be approximately 0.125 inch longer than bearing sleeve 50, or approximately 0.812 inch, again with a wall thickness of approximately 0.125 inch. Preferably, a small clearance gap 59 will exist between the exterior of bearing sleeve 50 and interior of bearing housing 52, for example, between 0.003 and 0.010 inch. In the described embodiment, clearance gap 59 will be approximately 0.007 inch. Clearance gap 59 facilitates fluid communication from the exterior of radial bearing assembly 22, through vent aperture 58 to variable fluid chamber 64 between bearing housing 38 and bearing bushing 52. Fluid chamber 64 will preferably have a nominal annular dimension of approximately 0.015 inch.

In operation, when pump assembly 10 of FIG. 1, including compliant radial bearing assemblies 22, is operated within a well, each bearing assembly 22 will be exposed to the fluids being pumped. These fluids will be at a pressure established primarily by the fluid head in the well conduit above the pump. This fluid pressure will be communicated through the gap 59 between bearing sleeve 50 and bearing bushing 52 to fluid chamber 64 between bearing bushing 52 and bearing housing 38.

Prior to operation, such as during assembly and handling, the compliance provided by o-rings 56 will provide shock dampening for bearing assembly 22. During operation of pump assembly 10, as pump shaft 23 and the associated components rotate, high lateral forces will be dissipated as a result of the compliance between bearing bushing 52 and bearing housing 38 provided by o-rings 56 and the fluid viscosity therebetween. During relative movement between bearing bushing 52 and bearing housing 38, although the dimensions of various portions of variable fluid chamber 64 will vary, the volume of fluid chamber 64 will remain substantially constant. The compliance of variable fluid chamber 64 will be a function not only of the physical size of chamber 64, but also of the viscosity of the fluid in the chamber.

Thus, compliant radial bearing assembly 22 provides a bearing system including a ceramic bearing sleeve capable of withstanding the well fluids and the abrasive components contained therein, and also provides compliance to insulate the ceramic sleeves from stock, which shock would typically cause chipping or breakage of the ceramic members.

Figure 4:
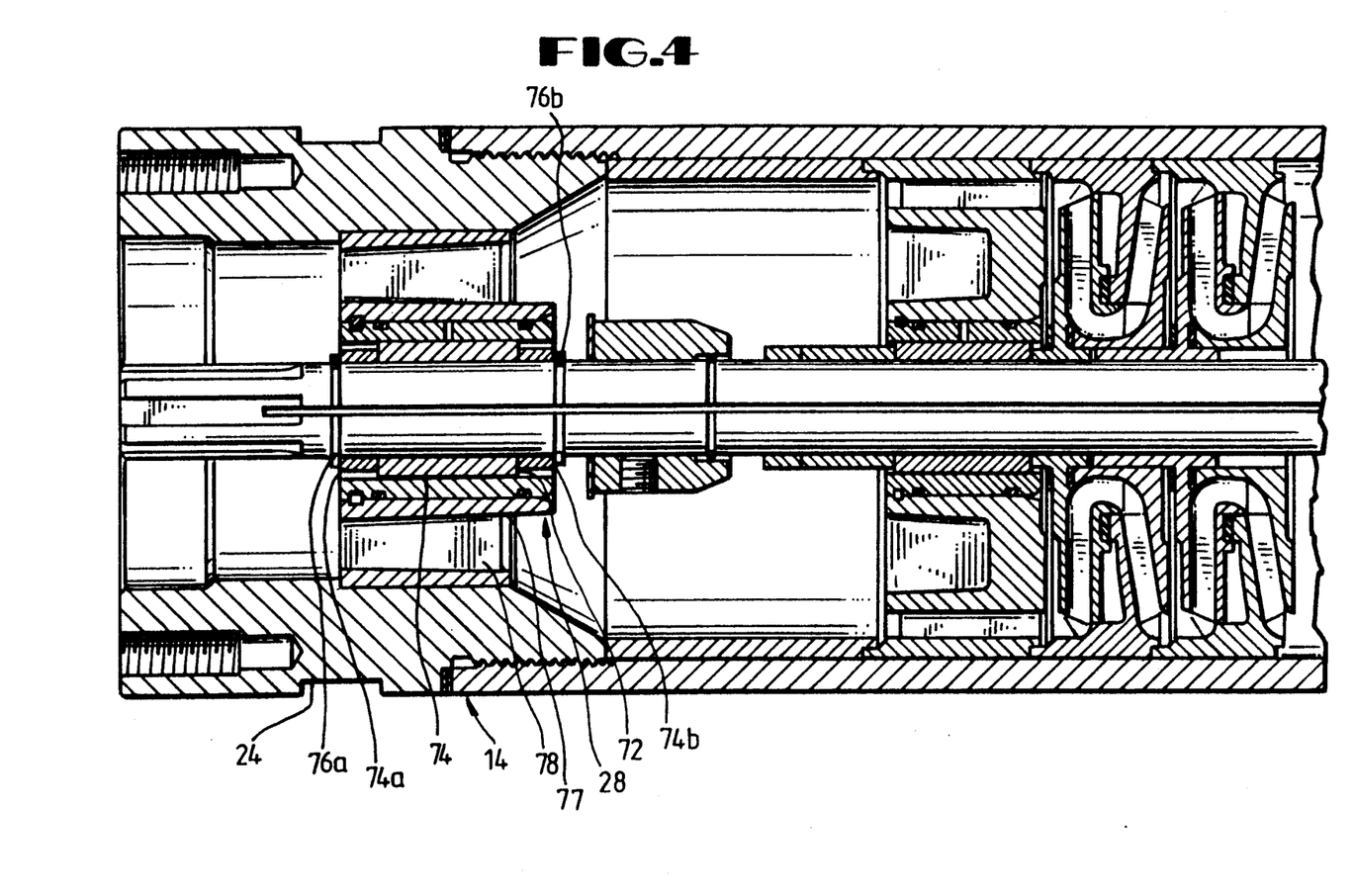
FIG. 4 depicts the upper end assembly of the pump of FIG. 1, illustrated partially in vertical section.

Referring now to FIG. 4, therein is depicted head assembly 14 of pump assembly 10. As noted previously, head assembly 14 includes a housing 24 to facilitate attachment of pump assembly 10 to other components. Head assembly 14 also includes a compliant radial bearing assembly, indicated generally at 28. Radial bearing assembly 28 is similar to the structure described for bearing assemblies 22 of pump section 12, with the exception that bearing assembly 28 includes a ceramic bearing sleeve 72 which is retained between two spacers 74a, 74b and two retaining rings 76a and 76b. Retaining rings 76a and 76b engage recesses in pump shaft 23 to prevent substantial longitudinal movement of ceramic bearing sleeve 72. Additionally, it will be noted that bearing assembly 28 includes a bearing housing 77 which includes a plurality of flow passages 78 to facilitate fluid communication from pump segments 20 up through head end assembly 14 to a conduit or to other equipment associated with pump assembly 10. In the depicted embodiment, bearing bushing 71 may be somewhat longer relative to bearing sleeve 72 then described relative to radial bearing assemblies 22, so as to permit longitudinal movement of shaft 23 relative to head end assembly 14 while retaining bearing sleeve 72 completely within bearing bushing 71. Radial bearing assembly 30 in base end assembly 16 (depicted in FIG. 1), may be of essentially identical configuration and structure to that described relative to bearing assembly 28 in head end assembly 14.

Figure 5:
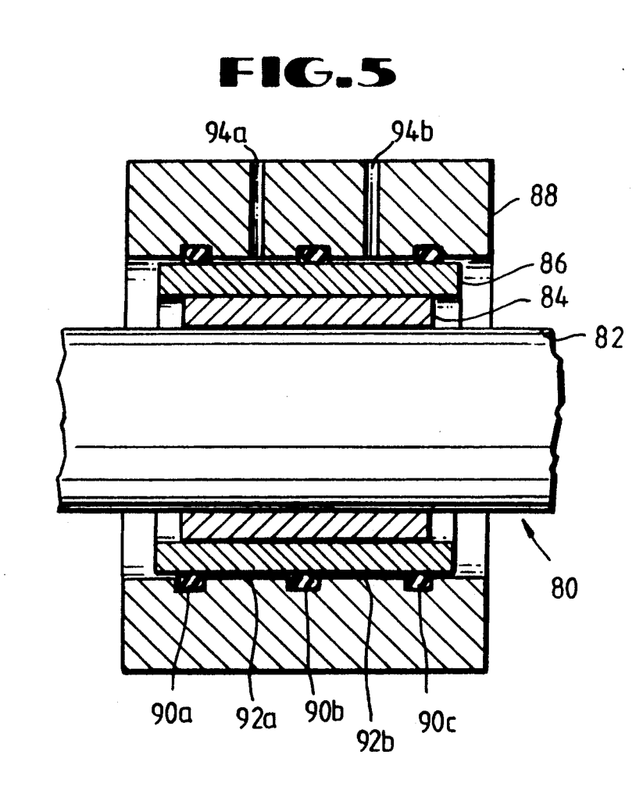
FIG. 5 depicts an alternative embodiment of a compliant bearing assembly in accordance with the present invention, illustrated partially in vertical section.

Referring now to FIG. 5, therein is depicted an alternative embodiment of a compliant radial bearing assembly, indicated generally at 80, depicted in an operative relationship relative to a shaft member 82 of a downhole rotating machine. As with other compliant radial bearing assemblies in accordance with the present invention, as described herein, radial bearing assembly 80 includes a bearing sleeve 84, a bearing bushing 86, and a bearing housing 88. As with the preceding described embodiments, bearing sleeve 84 will preferably be formed of a ceramic material as previously described; while bearing bushing 86 will preferably be formed of a hard metal. Radial bearing assembly 80 differs from preceding described embodiments primarily in that a greater plurality of o-rings is utilized to establish a plurality of fluid chambers 92a, 92b, and in that the o-rings are retained within grooves in bearing housing 88, rather than within grooves in the bearing bushing. In this case three o-rings 90a, 90b, and 90c are utilized to partially define fluid chambers 92a and 92b. Additionally, rather than fluid communication with gaps 92a and 92b being established through vent apertures in the bearing bushing, a pair of apertures 94a and 94b are provided in bearing housing 88. As will be apparent to those skilled in the art reviewing this disclosure, a number of o-rings greater than 3 may be utilized to establish fluid chambers. O-rings can be utilized in any number designed to provide either a desired resiliency or a desired degree of support between the bearing housing and the bearing bushing.

Figure 6:
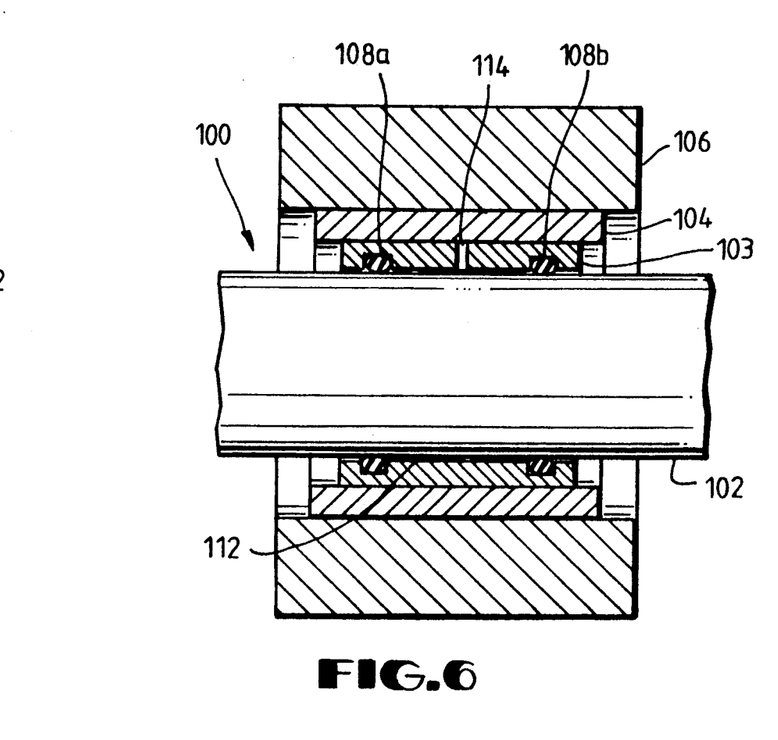
FIG. 6 depicts an alternative compliant bearing arrangement in accordance with the present invention, illustrated partially in vertical section.

Referring now to FIG. 6, therein is depicted another alternative embodiment of compliant radial bearing assembly in accordance with the present invention, indicated generally at 100. As with the previously described radial bearing assemblies, bearing assembly 100 includes a bearing sleeve 103, a bearing bushing 104, and a bearing housing 106. Radial bearing assembly 100 differs from previously described embodiments in that o-rings 108a and 108b contact shaft 102 to define a fluid chamber 112 between shaft 102 and bearing sleeve 104. In this embodiment, bearing sleeve 104 will preferably include a vent aperture 114 to provide fluid communication through a clearance gap 103 between sleeve 104 and bearing bushing 106, to fluid chamber 112. This clearance gap may be similar to the clearance gap previously described with respect to bearing assembly 22 of FIGS. 1-3

Figure 7:
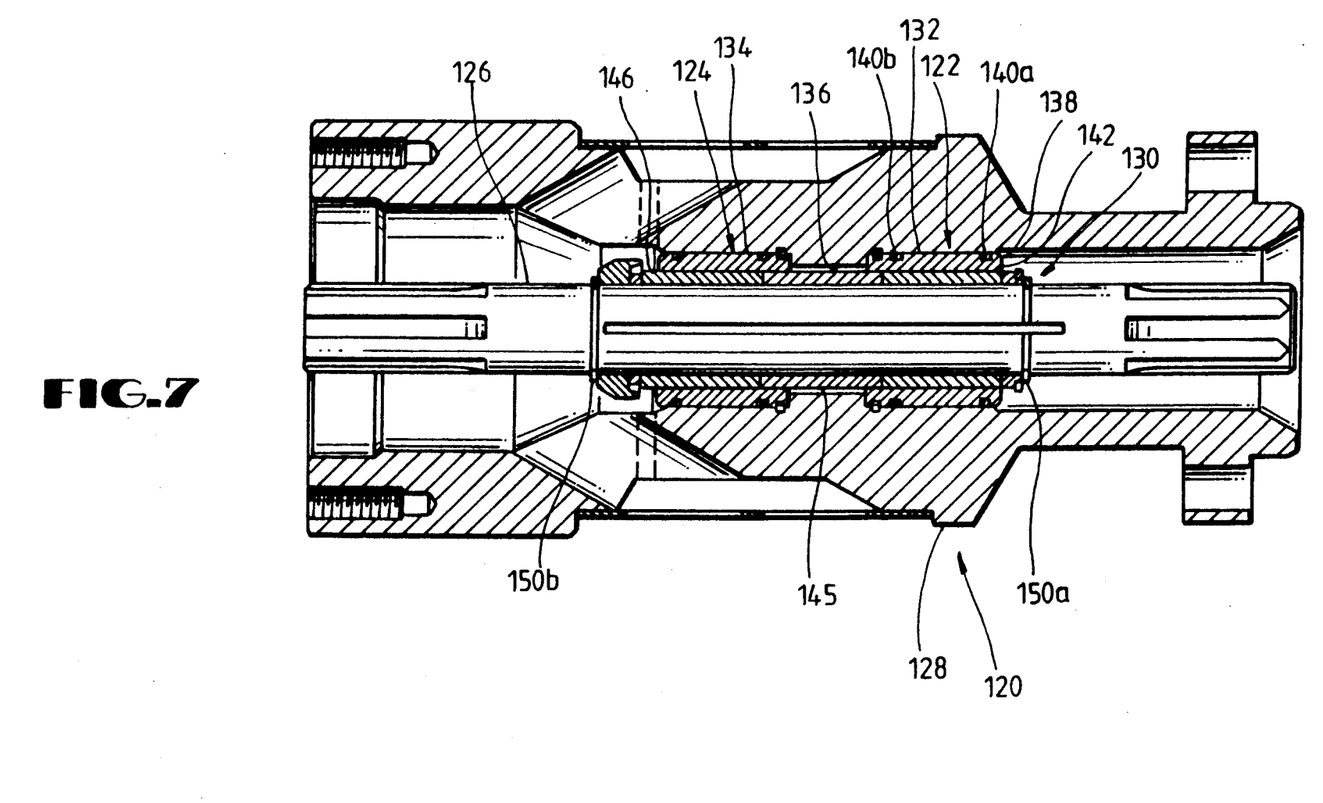
FIG. 7 depicts another downhole rotating machine in accordance with the present invention, having a pair of generally aligned compliant radial bearings, depicted partially in vertical section.

Referring now to FIG. 7, therein is depicted a downhole rotating machine in the form of a pump intake, illustrated generally at 120. Pump intake assembly 120 includes a pair of compliant radial bearings in accordance with the present invention, indicated at 122 and 124 respectively. Radial bearing assemblies 122 and 124 are placed in closely spaced relation to one another along a central shaft 126. In pump intake assembly 120, the bearing housing is provided by the pump intake housing 128. Pump intake housing 128 includes a central longitudinal bore, indicated generally at 130. Central longitudinal bore 130 of pump intake housing 128 includes several different internal diameters. In the depicted embodiment, pump intake housing 128 includes a central bore 130 having two sections of internal diameters, as indicated at 132 and 134, which form recesses relative to a central section of relatively reduced internal diameter, as indicated at 136. Lower recess 132 houses a bushing 138, with a pair of o-rings 140a and 140b establishing a compliant clearance between bushing 138 and pump intake housing 128. Once again, an annular ceramic bearing sleeve 142 extends between bushing 138 and shaft 126.

In this embodiment, fluid communication between central bore 130 and the clearance gap formed between bearing bushing 138 and housing 128 between o-rings 140a and 140b may be established by a vent aperture (not illustrated) in bearing bushing 138. Alternatively, however, one or both o-rings 140 and 140, rather than being a contiguous element, may be cut or otherwise formed to be noncontiguous, and to thereby establish a gap through which fluid may flow into the previously-described clearance gap. As will be apparent to those skilled in the art from review of FIG. 7, compliant radial bearing assembly 124 may be of essentially complimentary construction to that described with respect to bearing assembly 122. In the depicted embodiment, a spacer member 145 of a desired material may be provided between the bearing sleeves 138, 146 to provide the appropriate separation. The bearing sleeves 138, 146 may then be retained in position by an appropriate retention mechanism, including retaining rings 150a and 150b.

While several types of downhole rotating machines have been described and illustrated herein, it should readily be understood that other types of downhole equipment such as liquid-gas separators, motors, other designs of pumps, etc. may be constructed, and may benefit from use of compliant radial bearings in accordance with the present invention. Accordingly, many modifications and variations may be made in the techniques and structures described and illustrated herein. For example, bearing sleeves may be made from virtually any desired ceramic compound suitable for withstanding the downhole environment to which it will be exposed. Accordingly, it should be readily understood that the techniques and structures described and illustrated herein are illustrative only and are not to be considered as limitations upon the scope of the present invention.

What is claimed is:

1. A downhole rotating assembly for use in a subterranean well environment, said downhole rotating assembly comprising:
    a first assembly;
    a second assembly, said first and second assemblies cooperatively arranged for relative rotation; and
    a bearing assembly cooperatively associated with said first and second assemblies for facilitating said rotation, said bearing assembly having a plurality of members, comprising,
        a bearing housing operatively engaging said first assembly,
        a bearing sleeve operatively engaging said second assembly, and
        a bearing bushing disposed between said bearing housing and said bearing sleeve,
        wherein one of said bearing assembly members is operatively associated with a resilient member to at least partially define a fluid chamber, said fluid chamber also being at least partially defined by an adjacent surface of another member selected from the group of said bearing assembly members and said first and second assemblies, said fluid chamber having a variable dimension to facilitate relative movement between said bearing assembly member and said adjacent surface.

2. The downhole rotating assembly of claim 1, wherein said fluid chamber is cooperatively defined by a plurality of resilient members operatively associated with said bearing assembly member.

3. The downhole rotating assembly of claim 1, wherein said bearing assembly member at least partially defining said fluid chamber comprises an aperture to provide fluid communication to said chamber.

4. The downhole rotating assembly of claim 1, wherein said bearing sleeve is formed of a ceramic material.

5. The downhole rotating assembly of claim 4, wherein said ceramic material is silicon carbide.

6. The downhole rotating assembly of claim 1, wherein said bearing bushing is formed of a hard metal.

7. The downhole rotating assembly of claim 1, wherein said bearing bushing is formed of a ceramic material.

8. The downhole rotating assembly of claim 1, wherein said fluid chamber is formed between said bearing bushing and said bearing housing.

9. A downhole rotating machine for use in a subterranean well, said downhole rotating assembly comprising a first assembly;
    a second assembly, said first and second assemblies cooperatively arranged for relative rotation, said second assembly including a shaft member; and
    a bearing assembly cooperatively engaging said first and second assemblies for facilitating said relative rotation therebetween, said bearing assembly comprising,
        a bearing housing operatively associated with said first assembly, said bearing housing having a generally cylindrical internal diameter,
        a bearing sleeve operatively associated with said second assembly, said bearing sleeve having a generally cylindrical exterior surface, said bearing sleeve adapted to cooperatively engage said shaft member of said second assembly, and
        a bearing bushing disposed between said bearing housing and said bearing sleeve, said bearing bushing having a generally tubular configuration, wherein fluid chamber is formed between two adjacent members selected from the group of said shaft, said bearing sleeve, said bearing bushing, and said bearing housing, said fluid chamber also being partially defined by at least two resilient members placed between said selected two adjacent members partially defining said fluid chamber.

10. The downhole rotating machine of claim 9, wherein said bearing sleeve is formed of a ceramic material.

11. The downhole rotating assembly of claim 9, wherein said chamber is formed between said bearing sleeve and said shaft member, and wherein said resilient members are located between said bearing sleeve and said shaft member.

12. The downhole rotating machine of claim 11, wherein said bearing sleeve includes an aperture to provide fluid communication to said fluid chamber.

13. The downhole rotating machine of claim 9, wherein said fluid chamber is formed between said bearing housing and said bearing bushing, and wherein said resilient members are located between said bearing housing and said bearing bushing.

14. The bearing assembly of claim 13, further comprising means for providing fluid communication from the exterior of said bearing assembly to said fluid chamber.

15. A compliant bearing for use in a downhole rotating assembly to facilitate relative rotation between a shaft and a housing member, comprising,
    a bearing sleeve suitable for engaging said shaft member;
    a bearing housing suitable for engaging said assembly housing;
    a bearing bushing extending between said bearing housing and said bearing sleeve; and
    a plurality of generally resilient members operatively associated with the internal surface of said bearing housing, said resilient members engaging said bearing bushing to cooperatively define a chamber between bearing bushing and said bearing housing.

16. The bearing assembly of claim 15, further comprising means for providing fluid communication from the exterior of said bearing assembly to said fluid chamber.

17. A compliant bearing for use in a downhole rotating assembly to facilitate relative rotation between a shaft and a housing member, comprising,
    a bearing sleeve suitable for engaging said shaft member;
    a bearing housing suitable for engaging said housing member;
    a bearing bushing extending between said bearing housing and said bearing sleeve; and
    a plurality of generally resilient members operatively associated with the external surface of said bearing bushing, said resilient members engaging said bearing housing to cooperatively define a chamber between said bearing bushing and said bearing housing.

* * * * *

UNITED STATES PATENT AND TRADEMARK OFFICE
CERTIFICATE OF CORRECTION

PATENT NO. : 5,209,577
DATED : May 11, 1993
INVENTOR(S) : Mike A. Swatek

It is certified that error appears in the above-indentified patent and that said Letters Patent is hereby corrected as shown below:

Column 5, line 64 "stock" should read --shock--.

Signed and Sealed this

Eighth Day of February, 1994

Attest:

BRUCE LEHMAN

Attesting Officer  Commissioner of Patents and Trademarks